United States Patent [19]
Iwao et al.

[11] Patent Number: 5,427,582
[45] Date of Patent: Jun. 27, 1995

[54] CHAIN DRIVE DEVICE

[75] Inventors: Keijiro Iwao, Yokosuka; Ichiro Yamazaki, Komae, both of Japan

[73] Assignee: Nissan Motor Co., Ltd., Kanagawa Prefecture, Japan

[21] Appl. No.: 278,194

[22] Filed: Jul. 21, 1994

[30] Foreign Application Priority Data

Jul. 23, 1993 [JP] Japan .................. 5-182801

[51] Int. Cl.$^6$ .............................................. F16H 7/00
[52] U.S. Cl. ...................................................... 474/111
[58] Field of Search ................. 474/101, 109–111, 474/113–117, 133–138

[56] References Cited

U.S. PATENT DOCUMENTS

| | | | |
|---|---|---|---|
| 4,480,603 | 11/1984 | Tsuboi | 474/111 X |
| 5,286,234 | 2/1994 | Young | 474/111 |
| 5,366,418 | 11/1994 | Fukushima et al. | 474/111 |

FOREIGN PATENT DOCUMENTS 58-193959  11/1983  Japan .

*Primary Examiner*—Michael Powell Buiz
*Attorney, Agent, or Firm*—Lowe, Price, LeBlanc & Becker

[57] ABSTRACT

A chain drive device comprising at least a plural sprockets and a chain having a plural links and wrapped around said sprockets, and which chain drive device transmitting a driving force between said sprockets through said chain, is characterized in that, with reference to at least one of said sprockets, twice a number of said links wrapped around said sprocket is set as an odd number in case of a wrapping angle of said chain to said sprocket being less than 90°, and twice a number of the links wrapped around said sprocket is set as an even number in case of a wrapping angle of said chain to said sprocket being equal to or more than 90°. Such a construction achieves noise reducing effect without providing additional parts.

2 Claims, 8 Drawing Sheets

FIG_1
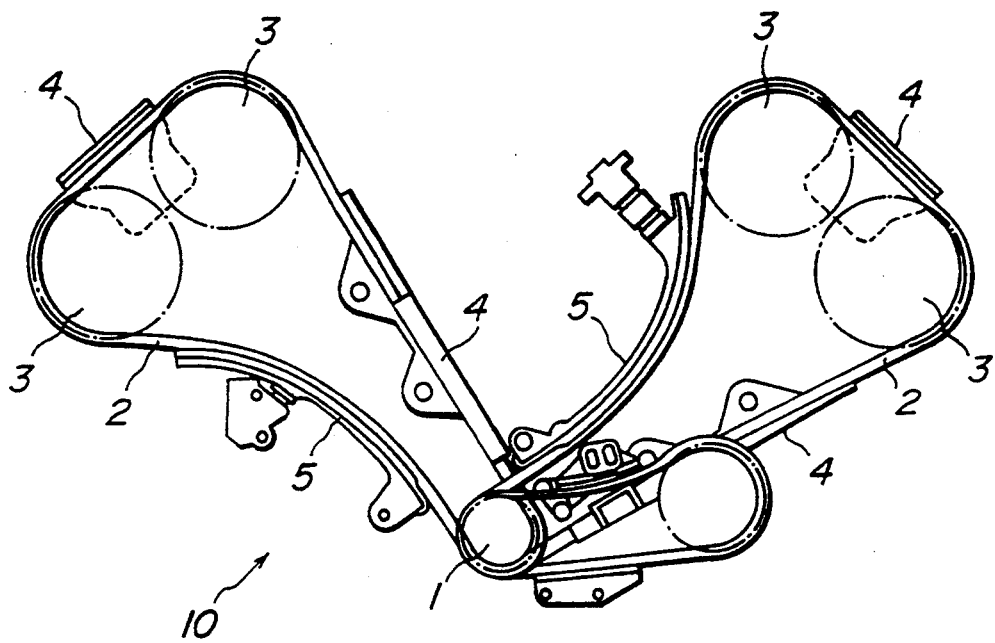
FIG_2
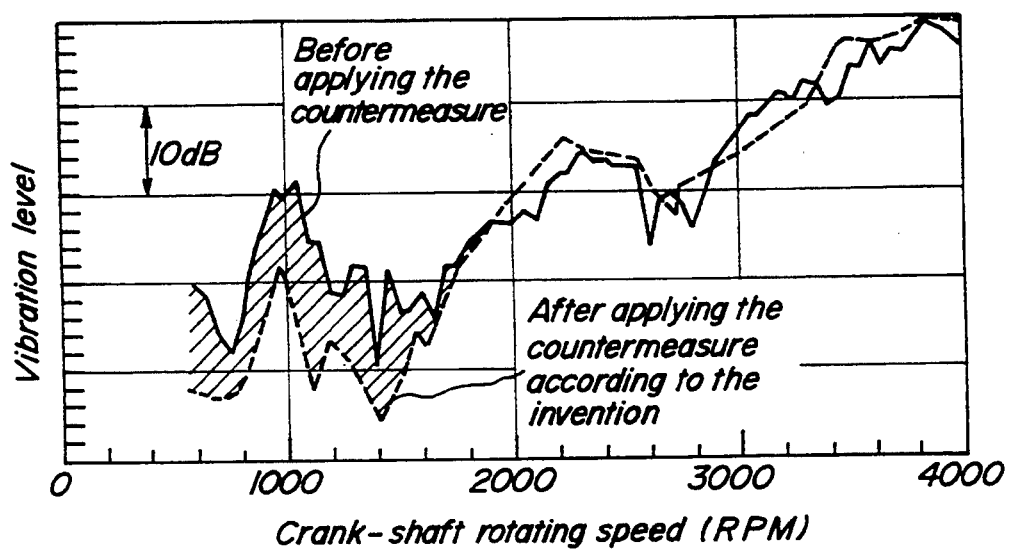

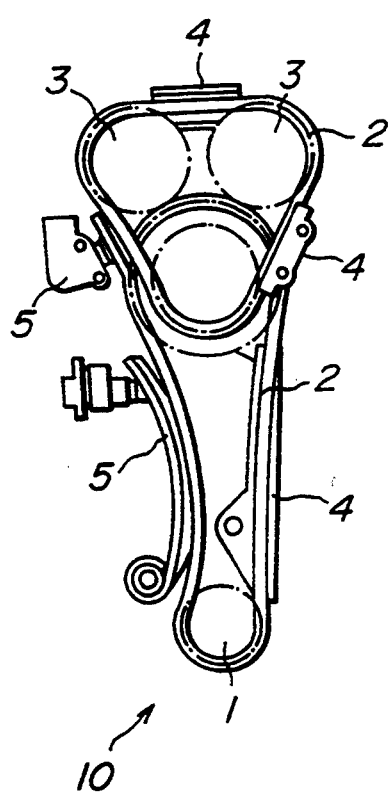
FIG._3a
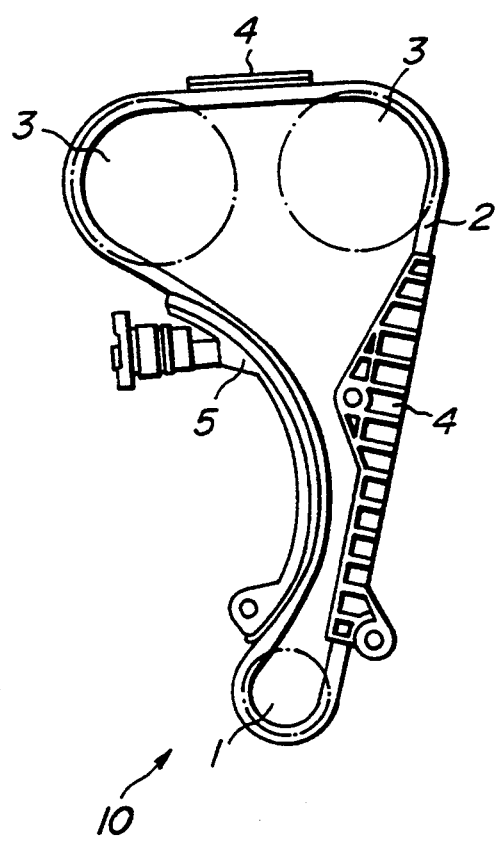
FIG._3b

FIG_4a
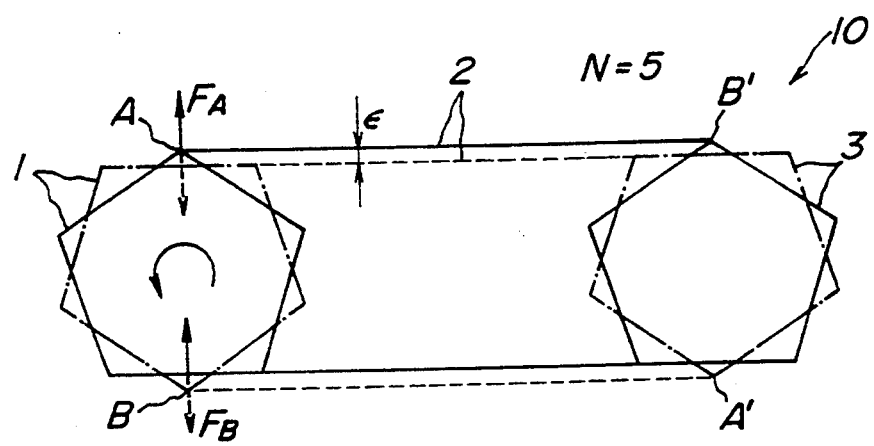
FIG_4b
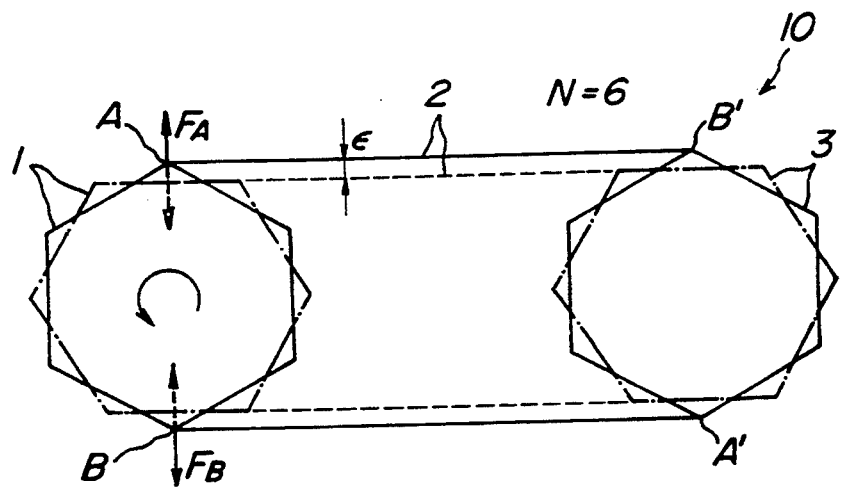

FIG._5
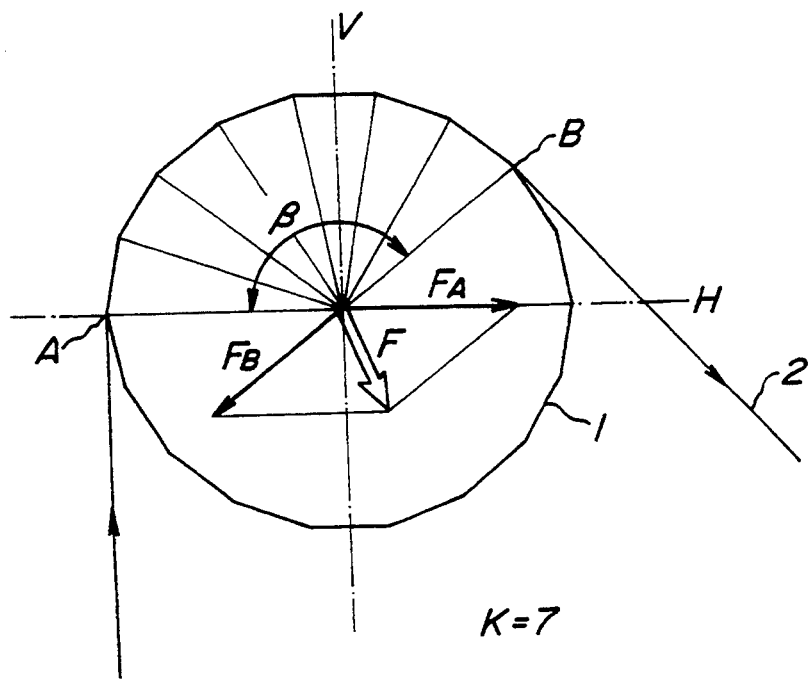
K=7
FIG._6
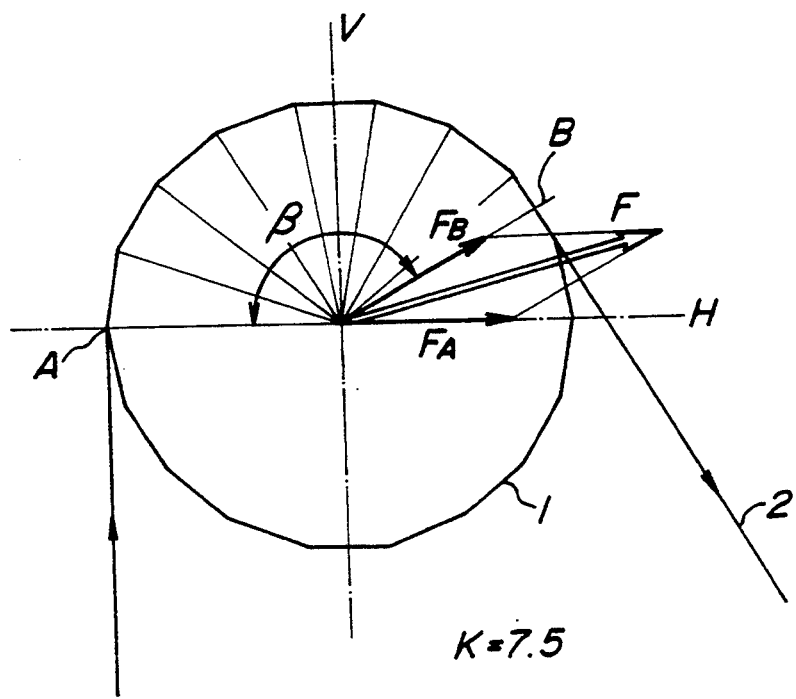
K=7.5

FIG_7
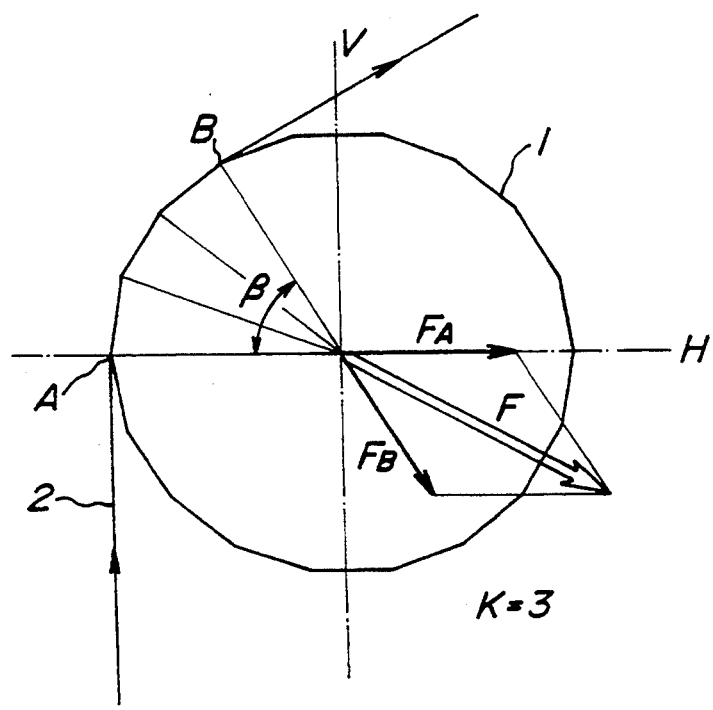
K=3
FIG_8
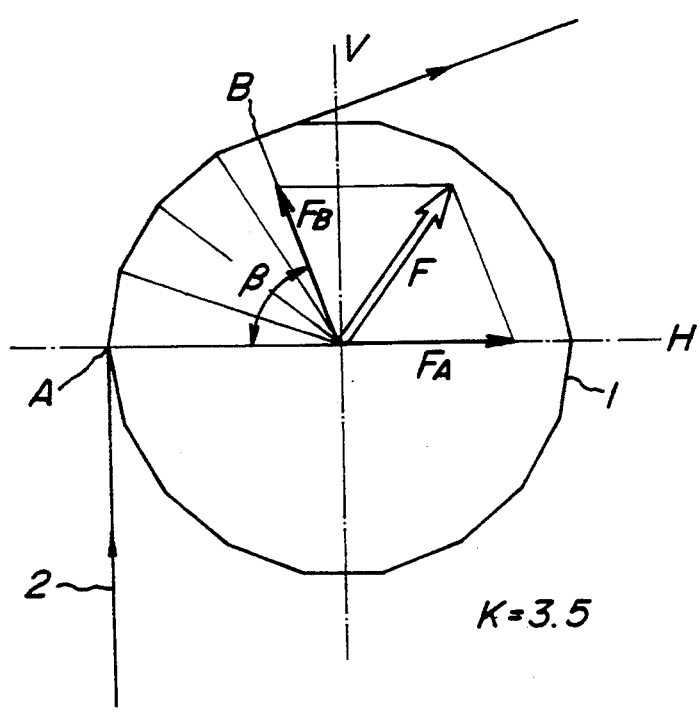
K=3.5

FIG_10 (PRIOR ART)

CHAIN DRIVE DEVICE

BACKGROUND OF THE INVENTION

1. Field of the Present Invention

The invention relates to a chain drive device which is utilized as a power transmission to rotate one or more cam-shafts of an internal combustion engine such as an engine for a vehicle with a stated timing, which chain drive device comprising at least a plural sprockets and a chain having a plural links and wrapped around the sprockets, and which chain drive device transmitting a driving force between the sprockets through the chain. The invention especially relates to a chain drive device of the abovementioned type which is improved to reduce a vibrating force given from the chain to the sprockets.

2. Description of the Related Art

FIG. 10 shows a front view of a known chain drive device of the abovementioned type. This chain drive device 10 is explained below as, for example a device which rotates a cam-shaft for reciprocating inlet valves and exhort valves of an engine for a vehicle.

The chain drive device 10 consists of a crank-side sprocket 1 (with N teeth) directly connected to a crank-shaft (not shown) of the engine, a cam-side sprocket 3 (with 2N teeth) directly connected to a cam-shaft (not shown) of the engine, a chain 2 having a plural links 2a and wrapped around both of the crank-side sprocket 1 and the cam-side sprocket 3, and two chain guides 4, 5 which are provided along the chain paths between the crank-side sprocket 1 and the cam-side sprocket 3 and which regulate the path of the chain 2, prevent rattling of the chain 2 and give a tension to the chain 2. Thus, a driving rotating-force given from the crank-shaft to the crank-side sprocket 1 is transmitted from the crank-side sprocket 1 to the cam-side sprocket 3 through the chain 2, and further transmitted from the cam-side sprocket 3 to the cam-shaft.

In the chain drive device 10 in FIG. 10, the crank-side sprocket 1 engages with the chain 2 at an engaging point A and separates from the chain 2 at a separating point B. On the other hand, the cam-side sprocket 3 engages with the chain 2 at another engaging point A' and separates from the chain 2 at another separating point B'. The chain 2 is wrapped over the crank-side sprocket 1 with a wrapping angle $\beta$, and is wrapped over the cam-side sprocket 3 with another wrapping angle $\beta'$. The crank-shaft and hence the crank-side sprocket 1 is rotating at an angular speed of $\omega$.

During a turn of the crank-side sprocket 1, N links 2a of the chain 2 pass through each of the engaging point A and the separating point B causing a cyclic movement which is called as a first order component of a chain engagement or a Nth order component of an engine rotation, therefore, due to changes of the path of the chain 2 from a straight path to a polygonal path at the engaging point A and from a polygonal path to a straight path at the separating point B, the links 2a repeat a forced displacement of magnitude $\epsilon$ as shown in FIG. 11, which forced displacement changes with time as shown in FIG. 12.

Thus, due to a force of inertia of the chain 2, a vibrating force having a cycle of N times of the angular speed $\omega$ i.e. $\sin(N \cdot \omega)$ is given from the chain 2 to the crank-side sprocket 1 at each of the engaging point A and the separating point B. Similarly, such a vibrating force is given from the chain 2 to the cam-side sprocket 3 at each of the engaging point A' and the separating point B'.

These vibrating forces are transmitted to the crank-shaft and cam-shaft and vibrate a cylinder block etc. of the engine, so that these vibrating forces are emitted out from the engine causing aggravation of a noise level of the engine.

Such a phenomenon is conspicuous in a chain drive system used in an internal combustion engine, and is not become a problem in other common chain drive system. Because, in an internal combustion engine, driving speed of the chain is very high relatively to other common cases, so that the force of inertia of the chain increases in proportion as the chain speed raised to the second power, thus the vibrating forces produced by the force of inertia tend to become especially large and become conspicuous. That is, the abovementioned phenomenon is a problem almost peculiar to a chain drive system used in an internal combustion engine.

A prior art chain drive device aiming to solve the problem is disclosed in the Japanese Patent Application Laid-open No. 193959/58. In this chain drive device, the forced displacement is restrained by providing a roller which pushes the chain path in by force in a distance corresponding to the magnitude $\epsilon$ of the forced displacement just before the chain is engaged with the sprocket, so as to reduce a striking noise produced by a collision between the chain and the sprocket.

Though, it is found by a phenomenon analysis carried by inventors of the present invention that, especially in a low rotating speed region (e.g. a rotating speed region below 2500 rpm), the noise emitted due to the vibrating forces is dominant rather than the striking noise produced by the collision.

Therefore, the prior art considering only the chain engaging point cannot achieve a sufficient noise reduction effect. Supposing that the prior art chain drive device is further provided a roller for restraining the forced displacement at a chain separating point so as to achieve a sufficient noise reduction effect, the chain drive device is required to provide such a roller for each of the engaging point A, A' and the separating point B, B' other than the chain guides 4, 5 as shown in FIG. 10, which chain drive device construction, as a matter of fact, invites other problems such as an enlargement of an engine size etc. except for there being a sufficient space, and which construction invites further problems of e.g. an occurrence of a new kind of vibration at a contact point between the roller and the chain.

SUMMARY OF THE INVENTION

It is an object of the invention to provide a chain drive device of the type defined in the opening paragraph, which chain drive device can reduce the noise due to the vibrating force given from the chain to the sprockets without providing additional parts.

To this end, the chain drive device in accordance with the invention is characterized in that, with reference to each of the sprockets, at least one chain guide is provided to contact to and force the chain to set twice a number of the links wrapped around the sprocket as an odd number in case of a wrapping angle of the chain to the sprocket being less than 90°, and to set twice a number of the links wrapped around the sprocket as an even number in case of a wrapping angle of the chain to the sprocket being equal to or more than 90°.

The number K of the links wrapped around the sprocket corresponds to, e.g. in the chain drive device in FIG. 10, the number of the links 2a which present in a region from the engaging point A to the separating point B of the crank-side sprocket 1, and the number of the links 2a which present in a region from the engaging point A' to the separating point B'.

And a value 2K of the twice the number of the links is not required to be an even number exactly, but the value 2K is enough to be an even number substantially, so that an error of ±some percents of the value 2K which may occur by manufacturing tolerance results in no problem.

FIG. 4a and FIG. 4b show two types of a chain drive device 10 as most simplified examples to explain an action of the chain drive device in accordance with the invention. Each chain drive device 10 consists of two sprockets 1, 3 having N teeth mutually and a chain 2 wrapped around the sprockets, wherein wrapping angles of the chain 2 to the sprockets 1, 3 are both 180° and the number N of teeth of the sprockets 1, 3 is 5 (N=5) in case of the device in FIG. 4a, on the other hand the number N of teeth of the sprockets 1, 3 is 6 (N=6) in case of the device in FIG. 4b.

That is, in case of the device 10 in FIG. 4a wherein the number N of teeth of the sprockets 1, 3 is 5 (an odd number), e.g. noticing an engaging point A and a separating point B of the sprocket 1, when a connecting pin of a link of the chain 2 positions at the engaging point A, a center between two connecting pins of another link of the chain 2 positions at the separating point B, so that a forced displacement $\epsilon$ of each link of the chain 2 occurring at the engaging point A and a forced displacement $\epsilon$ of each link of the chain 2 occurring at the separating point B are in mutually same phases with respect to the sprocket 1.

Therefore, a vibrating force $F_A$ given from the chain 2 to the sprocket 1 at the engaging point A and a vibrating force $F_B$ given from the chain 2 to the sprocket i at the separating point B are in mutually same phases, so that a resultant vibrating force corresponding to a sum of the vibrating forces $F_A$ and $F_B$ is transmitted from the sprocket 1 to a shaft carrying the sprocket 1. Similarly, such a phenomenon occurs in the sprocket 3.

On the contrary, in case of the device 10 in FIG. 4b wherein the number N of teeth of the sprockets 1, 3 is 6 (an even number) in accordance with the invention, e.g. noticing an engaging point A and a separating point B of the sprocket 1, when a connecting pin of a link of the chain 2 positions at the engaging point A, a connecting pin of another link of the chain 2 also positions at the separating point B, so that a forced displacement $\epsilon$ of each link of the chain 2 occurring at the engaging point A and a forced displacement $\epsilon$ of each link of the chain 2 occurring at the separating point B are in mutually opposite phases with respect to the sprocket 1.

Therefore, a vibrating force $F_A$ given from the chain 2 to the sprocket 1 at the engaging point A and a vibrating force $F_B$ given from the chain 2 to the sprocket 1 at the separating point B are in mutually opposite phases, so that the vibrating forces $F_A$ and $F_B$ are mutually cancelled, thus a resultant vibrating force transmitted from the sprocket 1 to a shaft carrying the sprocket 1 becomes zero theoretically. Similarly, such a phenomenon occurs in the sprocket 3.

While the abovementioned examples are special cases having wrapping angles of the chain 2 to the sprockets 1, 3 of 180°, such a cancelling phenomenon of the vibrating forces $F_A$ and $F_B$ occurs in other cases than the case of the wrapping angle being 180°, thus it is found by inventors of the present invention that the abovementioned cancelling phenomenon of the vibrating forces $F_A$ and $F_B$ can be utilized by properly selecting the value 2K of twice a number K of the links wrapped around the sprocket and the wrapping angle of the chain to the sprocket.

FIG. 5 and FIG. 6 show two cases of the wrapping angle being equal to or more than 90°, wherein the number K of the links of the chain 2 which are wrapped around the sprocket 1 is 7 (2K is 14 and is an even number) in FIG. 5, on the other hand the number K of the links of the chain 2 wrapped around the sprocket 1 is 7.5 (2K is 15 and is an odd number) in FIG. 6. Further, FIG. 7 and FIG. 8 show two cases of the wrapping angle being less than 90°, wherein the number K of the links of the chain 2 which are wrapped around the sprocket 1 is 3 (2K is 6 and is an even number) in FIG. 7, on the other hand the number K of the links of the chain 2 wrapped around the sprocket 1 is 3.5 (2K is 7 and is an odd number) in FIG. 8. In FIG. 5 to FIG. 8, a direction parallel to a vibrating force $F_A$ given from the chain 2 to the sprocket 1 at the engaging point A is shown by a letter H, and a direction vertical to the vibrating force $F_A$ is shown by a letter V.

In FIG. 5 to FIG. 8, since a vibrating force $F_A$ is given from the chain 2 to the sprocket 1 at the engaging point A and another vibrating force $F_B$ is given from the chain 2 to the sprocket 1 at the separating point B, a resultant vibrating force F given from the chain 2 to the sprocket 1 becomes a composed vector of the vibrating forces $F_A$ and $F_B$.

Therefore, if an angle between two vectors of the vibrating forces $F_A$ and $F_B$ is more than 90°, an absolute value of the resultant vibrating force F becomes less than absolute values of the vibrating forces $F_A$ and $F_B$. Further, it will be understood from the relationship between the phases of the vibrating forces $F_A$ and $F_B$ explained above with FIG. 4a and FIG. 4b and from conditions shown in FIG. 5 to FIG. 8 that, when a value 2K of twice a number K of the links wrapped around the sprocket is set as an odd number in case of a wrapping angle $\beta$ of the chain to the sprocket being less than 90°, and when a value 2K of twice a number K of the links wrapped around the sprocket is set as an even number in case of a wrapping angle $\beta$ of the chain to the sprocket being equal to or more than 90°, the angle between two vectors of the vibrating forces $F_A$ and $F_B$ becomes more than 90°.

FIG. 9 graphically shows a relationship among the number K of the links wrapped around the sprocket, the wrapping angle $\beta$ of the chain to the sprocket, and a component in the direction H and a component in the direction V of the resultant vibrating force F with reference to the sprocket having N=18 teeth.

It is found from FIG. 9 that the component in the direction H of the resultant vibrating force F changes in shorter cycle than the component in the direction V, that is, the component in the direction H repeats to assume a maximum value and a minimum value corresponding to each change of 0.5 of the number K of the links.

In the meantime, a chain drive device of the abovementioned type used in common internal combustion engines usually tends to have a high rigidity to the direction V to which a tension of the chain is brought at the engaging point A, while having a low rigidity to the direction H except for a case of noticing a vibration. Therefore, it is especially effective to take a countermeasure to the vibration in the direction H.

Consequently, as indicated by a circle in the graph in FIG. 9, a point at which the component in the direction H assumes a minimum value and at which a value 2K of twice the number K of the links is an odd number if the wrapping angle $\beta$ is less than 90° and a value 2K of twice the number K of the links becomes an even number if the wrapping angle $\beta$ is equal to or more than 90°, becomes an effective point, so that if the wrapping angle $\beta$ is near the point the best vibration reducing effect can be expected.

Thus, in the device in accordance with the invention, a vibrating force given from the chain at the engaging point and another vibrating force given from the chain at the separating point effect to the sprocket in mutually cancelling directions, so that a resultant vibrating force of the forces given from the chain to the sprocket becomes smaller than that in case of no countermeasure.

Further, in the preferred embodiment of the device in accordance with the invention, at least one chain guide is provided to contact to and force the chain in a chain path between the sprockets to regulate the path, prevent rattling of the chain, give a tension to the chain and :set the twice a number of the links in accordance with the invention, by selecting a shape and/or a layout etc. of the chain guide properly, a vibrating force given from the chain at the engaging point and another vibrating force given from the chain at the separating point effect to the sprocket in mutually cancelling directions, remaining a diameter, a number of teeth and a position etc. of the sprockets.

BRIEF DESCRIPTION OF THE DRAWINGS

The present invention will now be explained in more detail with reference to some preferred embodiments shown in the attached drawings, in which:

FIG. 1 shows a front view of a preferred embodiment of the chain drive device in accordance with the invention.

FIG. 2 shows a frequency characteristic diagram for explaining, an action of the embodiment in FIG. 1;

FIG. 3a and FIG. 3b show other preferred embodiments of the chain drive device in accordance with the invention;

FIG. 4a and FIG. 4b show a chain drive device of two types for explaining an action of the chain drive device in accordance with the invention;

FIG. 5 shows the vibrating forces $F_A$ and $F_B$ in case of the wrapping angle $\beta$ being equal to or more than 90° and the number K of the links being 7;

FIG. 6 shows the vibrating forces $F_A$ and $F_B$ in case of the wrapping angle $\beta$ being equal to or more than 90° and the number K of the links being 7.5;

FIG. 7 shows the vibrating forces $F_A$ and $F_B$ in case of the wrapping angle $\beta$ being less than 90° and the number K of the links being 3;

FIG. 8 shows the vibrating forces $F_A$ and $F_B$ in case of the wrapping angle $\beta$ being less than 90° and the number K of the links being 3.5;

DETAILED EXPLANATION OF THE PREFERRED EMBODIMENTS

Figure 9:
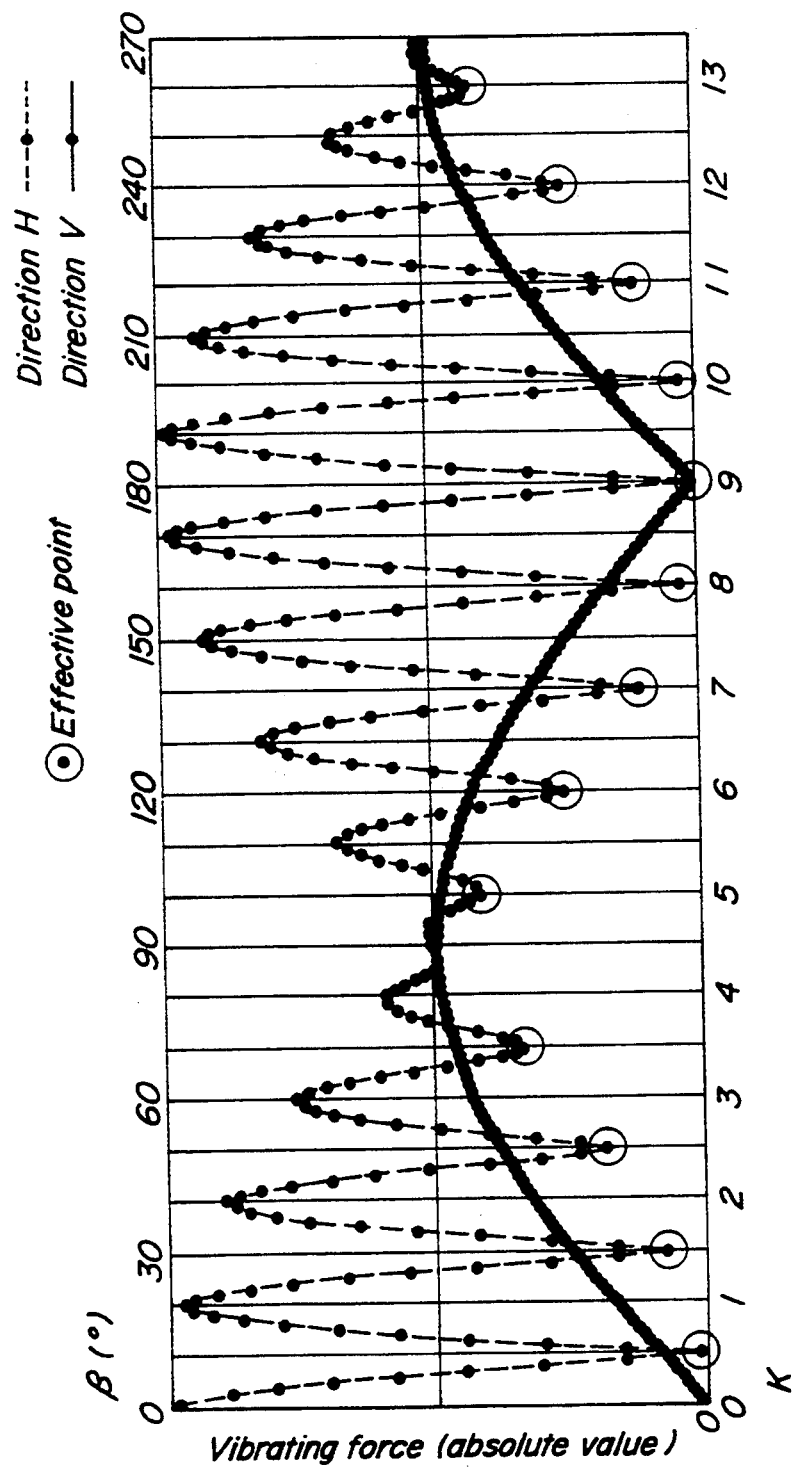
FIG. 9 graphically shows a relationship among the number K of the links, the wrapping angle $\beta$ of the chain, and a component in the direction H and a component in the direction V of the resultant vibrating force F.
Figure 10:
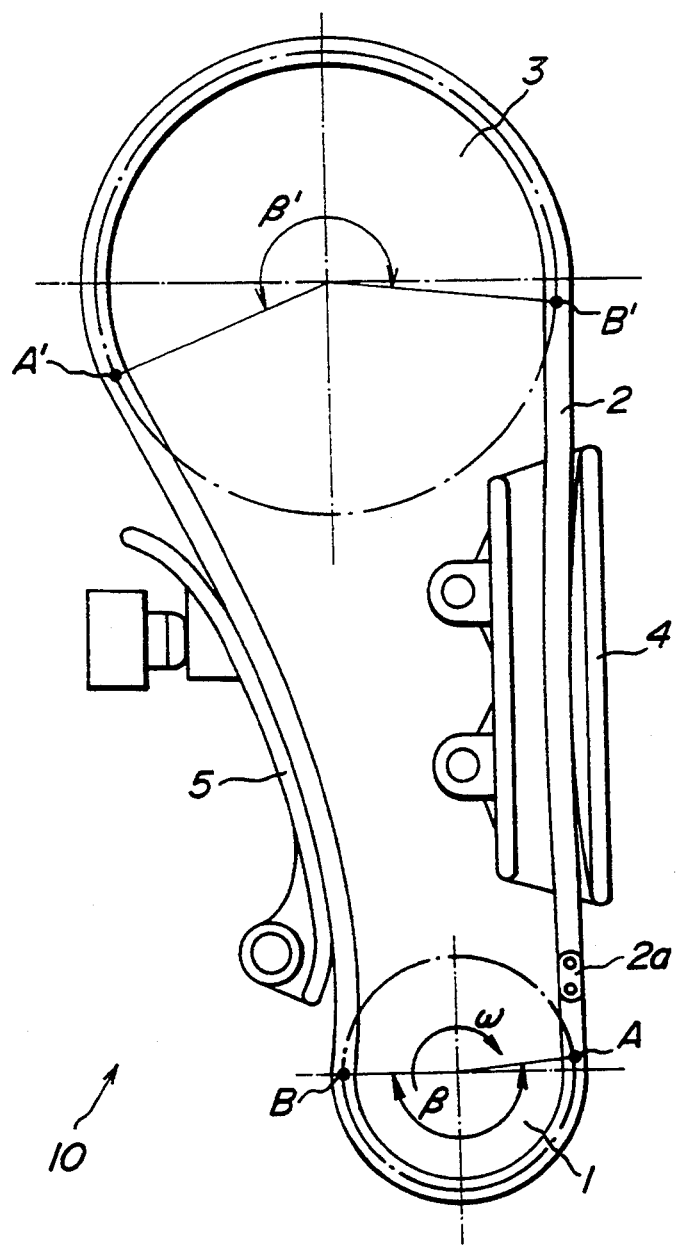
FIG. 10 shows a front view of a known chain drive devise.
Figure 11:
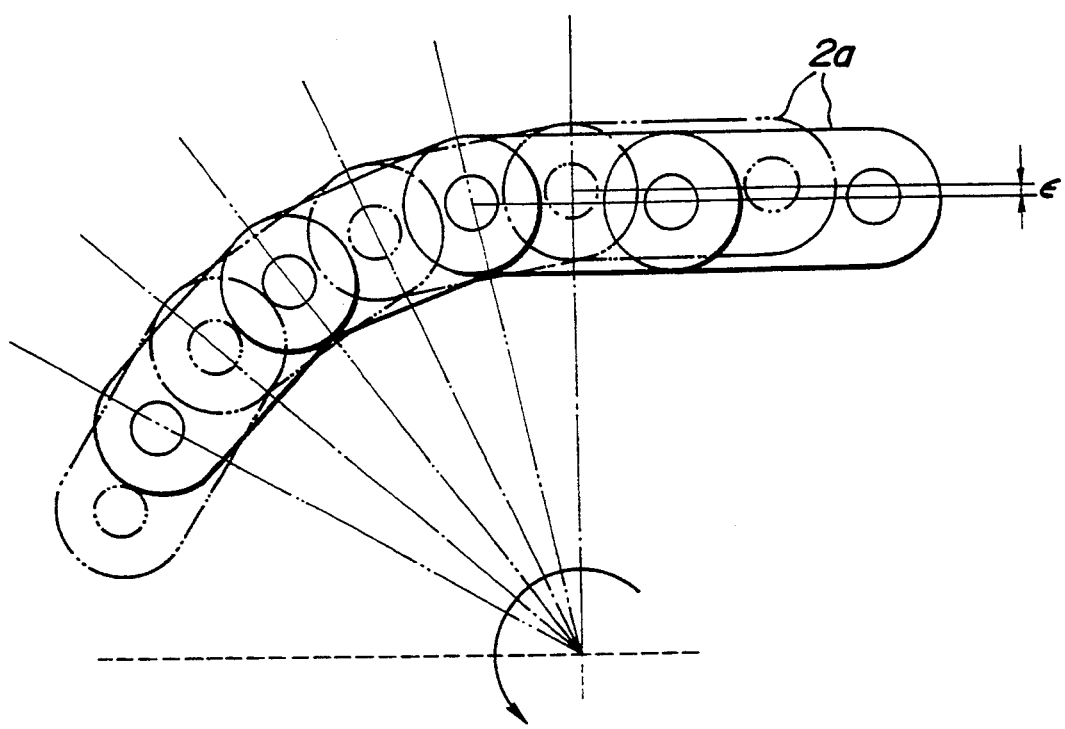
FIG. 11 shows a forced displacement of the chain.
Figure 12:
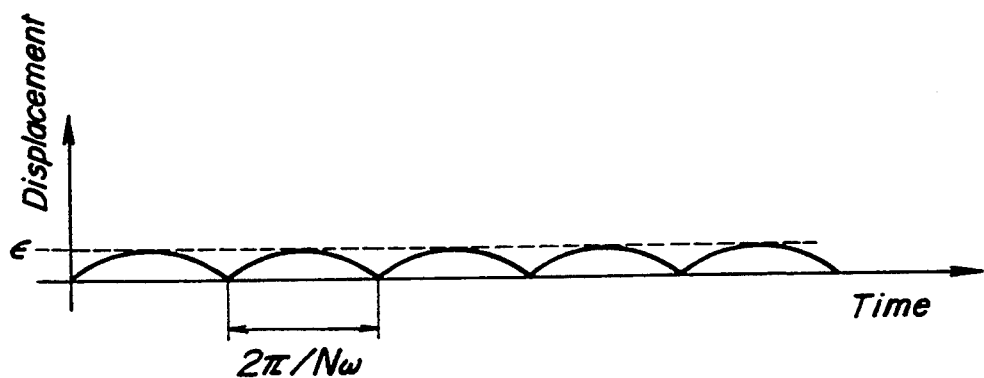
FIG. 12 shows a magnitude of the forced displacement of the chain.

The chain drive device 10 in FIG. 1 applied with the preferred embodiment of the invention is a device to drive four cam-shafts of an engine of Double Over Head Cam-shaft type and V type which is one of engine types for a vehicle.

The chain drive device 10 comprises two crank-side sprockets 1 directly connected to a crank-shaft (not shown) of the engine, four cam-side sprockets 3 directly connected to the four cam-shaft (not shown) of the engine respectively, two chains 2 having a plural links and wrapped around both of the crank-side sprocket 1 and two of the cam-side sprockets 3 respectively, and two pairs of chain guides 4, 5 which are provided along the chain paths between the crank-side sprocket 1 and the cam-side sprocket 3 and which contact to and force the chains 2 to regulate the path of the chains 2, prevent rattling of the chains 2 and give tensions to the chains 2. Incidentally, the chain guides 5 serve mainly to give tensions to the chains 2, so that the chain guides 5 are usually called a tensioner guide. Thus, the chain drive device 10 transmit a driving rotating-force from the crank-side sprocket 1 to the cam-side sprockets 3 through the chains 2.

Further, in the chain drive device 10, in accordance with the preferred embodiment of the invention, with reference to each of the sprockets 1, 3, the chain guides 4, 5 set a value 2K of twice the number K of the links wrapped around the sprocket 1, 3 as an odd number in case of the wrapping angle $\beta$ of the chain 2 to the sprocket 1, 3 being less than 90°, and set a value 2K of twice the number K of the links wrapped around the sprocket 1, 3 as an even number in case of the wrapping angle $\beta$ of the chain 2 to the sprocket 1, 3 being equal to or more than 90°, by selecting a shape and/or a layout etc. of the chain guides 4, 5 properly.

That is, since the wrapping angle $\beta$ of the chain 2 to the sprocket 1, 3 and the number K of the links wrapped around the sprocket 1, 3 are almost decided under restricting conditions with reference to a diameter, a number of teeth and a relative position etc. of each of the sprockets 1, 3, and further a size of each of the links of the chain 2, a shape and/or a layout etc. of the chain guides 4, 5 is properly selected and tuned to set the wrapping angle $\beta$ and the number K of the links to one of the effective points in FIG. 9.

As a result of such a construction, abovementioned vibrating forces given from the chains 2 to the sprockets 1, 3 are mutually cancelled in each of the sprockets 1, 3, therefore a level of a vibration transmitted from each sprocket 1, 3 to the crank-shaft and the cam-shaft is lowered, thus a level of a noise emitted out from a cylinder block etc. of the engine is lowered. Such an action of the embodiment can be seen in FIG. 2, wherein it is found that especially high vibration reducing effect can be achieved in a low rotating speed region.

Further, in the embodiment, since the desired construction is carried out by selecting a shape and/or a layout etc. of the chain guides 4, 5, there is an advantage that the chain drive device 10 is not required to change e.g. the diameter and the layout of the sprockets 1, 3 etc., so that, by the embodiment, the invention can be easily applied to a chain drive device 10 used in a previous engine without substantial changing of the construction thereof.

While the present invention has been described with reference to the embodiment applied to the chain drive device 10 for an engine of Double Over Head Camshaft type and V type, the invention is not limited to the embodiment but can be applied to, e.g. chain drive devices 10 for an engine of Double Over Head Camshaft type but not V type as shown in FIG. 3a and FIG. 3b.

Further, the present invention can be applied to a chain drive device except for an engine for a vehicle, and it is of course that various alterations and/or modifications may be made without departing from the scope of the invention.

What is claimed is:

1. A chain drive device comprising at least a plural sprockets and a chain having a plural links and wrapped around said sprockets, and which chain drive device transmitting a driving force between said sprockets through said chain, wherein:

with reference to each of said sprockets, at least one chain guide is provided to contact to and force said chain to set twice a number of said links wrapped around said sprocket as an odd number in case of a wrapping angle of said chain to said sprocket being less than 90°, and to set twice a number of said links wrapped around said sprocket as an even number in case of a wrapping angle of said chain to said sprocket being equal to or more than 90°.

2. A chain drive device as claimed in claim 1; wherein, two chain guides are provided as said chain guide for each of said sprockets.

* * * * *